US006980743B1

(12) United States Patent
Greene

(10) Patent No.: US 6,980,743 B1

(45) Date of Patent: Dec. 27, 2005

(54) TRANSPARENT WAVELENGTH DIVISION MULTIPLEXING

(75) Inventor: Spencer Greene, Palo Alto, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 785 days.

(21) Appl. No.: 09/859,581

(22) Filed: May 18, 2001

(51) Int. Cl.[7] ......................... H04J 14/00; H04J 14/02; H04B 10/00; G02F 1/35

(52) U.S. Cl. ............................ 398/92; 398/48; 398/79; 398/157; 359/326

(58) Field of Search ............................. 398/79, 82, 92, 398/95, 187, 183, 43, 48, 49, 68, 157; 359/238, 359/341.31, 326

(56) References Cited

U.S. PATENT DOCUMENTS

| | | | | |
|---|---|---|---|---|
| 4,880,996 | A * | 11/1989 | Peterson et al. | 359/330 |
| 4,885,460 | A * | 12/1989 | Bartholomew | 250/216 |
| 5,715,076 | A * | 2/1998 | Alexander et al. | 398/87 |
| 6,324,318 | B1 * | 11/2001 | Suzuki | 385/24 |
| 6,636,342 | B2 * | 10/2003 | Furusawa et al. | 359/326 |
| 2001/0007509 | A1 * | 7/2001 | Aso et al. | 359/326 |
| 2002/0118415 | A1 * | 8/2002 | Dasylva et al. | 359/124 |

OTHER PUBLICATIONS

Stamatios V. Kartalopoulos: "Introduction to DWDM Technology Data in a Rainbow," IEEE Press 2000.

M.A. Arbore et al.: Difference frequency mixing in $LiNBO_3$/ waveguides using an adiabatically tapered periodically-segmented coupling region; *Lasers and Electro-Optics, 1996, CLEO '96,* Jun. 2-7, 1996, pp. 120-121.

L.A. Eyres et al.: "MBE growth of laterally antiphase-pattern GaAs films using thin Ge layers for waveguide mixing," *Lasers and Electro-Optics, 1998, CLEO 98, Technical Digest;* May 3-8, 1998; p. 276.

M. H. Chou et al.: "Bidirectional wavelength conversion between 1.3- and 1.5- m telecommunication bands using difference frequency mixing in $LiNbO_3$ waveguides with integrated coupling structures," *Lasers and Electro-Optics, 1998. CLEO 98, Technical Digest,* May 3-8, 1998; pp. 475-476.

* cited by examiner

*Primary Examiner*—M. R. Sedighian

(74) *Attorney, Agent, or Firm*—Harrity&Snyder, LLP

(57) ABSTRACT

Transparent wavelength division multiplexing systems and methods include an array of wavelength converters receiving n input signals and shifting the wavelength of each input signal by a different amount so that n different wavelengths result. Each of the wavelength converters shifts the wavelength of the input signal by a known amount. The resulting signals may be combined and transmitted over a fiber. A passive (or active) wavelength splitter may be used to recover the signals from the fiber, and deliver the signals directly to one or more network devices. Receivers in the receiving router or switch generally are not wavelength-specific, so the n optical signals need not be shifted back to a common wavelength prior to the router or switch.

24 Claims, 7 Drawing Sheets

TRANSPARENT WAVELENGTH DIVISION MULTIPLEXING

BACKGROUND OF THE INVENTION

1. Field of the Invention

The present invention relates generally to optical systems and, more particularly, to systems and methods for wavelength division multiplexing (WDM).

2. Description of Related Art

Wavelength division multiplexing (WDM) is a scheme for increasing the amount of information carried by an optical fiber. Generally, signals are modulated onto light beams, where each beam has a different wavelength. These different-wavelength beams are combined for transmission over a single, typically long-distance, fiber. At the receiving end, the light is split into the different wavelength beams, and each of these is demodulated to obtain the original signal.

FIG. 1 is a block diagram of a conventional communications system 100 employing WDM. The system 100 includes link source device(s) (LSD(s)) 110, LSD outputs 120, a WDM system 130, WDM system outputs 140, and link destination device(s) (LDD(s)) 150. The LSD(s) 110 provide outputs 120 on a pre-selected media (typically an optical fiber) using a pre-selected modulation. The WDM system 130 receives the outputs 120 and ultimately delivers them remotely as outputs 140 to the LDD(s) 150.

The LSD(s) 110 may include one or more switches, routers and/or add-drop multiplexers (ADMs) configured in various combinations to produce the outputs 120. The switch (es) may include networking or transmission devices configured to send data packets directly to ports associated with given network addresses or to cross connect circuits, or some combination thereof. The router(s) may include networking devices configured to find paths for data packets to be sent from one network to another. Such routers may store and forward messages between networks, for example by picking an expedient route based on the traffic load and/or the number or length of hops required. The ADMs may include devices in optical networks used to add and/or drop SONET, SDH, or other TDM channels. The LSD(s) 110 may produce optical signals (e.g., synchronous optical network (SONET) or Ethernet signals) or electrical signals carrying information to the WDM system.

Similarly, the LDD(s) 150 may include one or more switches, routers and/or ADMs configured in various combinations to receive the outputs 140. As with the LSD(s) 110, the LDD(s) 150 may include one or more switches, routers, and ADMs working in combination to receive and process various signals.

The WDM system 130 includes a multiplexer 132 that receives the outputs 120 into an internal digital format, modulates each input onto a different wavelength, combines the wavelengths, and transmits a single optical signal on a (typically wide-area) fiber 134. The WDM system 130 also includes a demultiplexer 136 that receives the signal from the fiber 134, separates the different wavelengths, and converts the information in the wavelengths into digital inputs 140 for the LDD(s) 150.

In FIG. 1, the signal coding of the LSD outputs 120 and the WDM system outputs 140 is typically standards-based. This allows the WDM system 130 to communicate with LSD(s) 110 and LDD(s)150 made by many different vendors. The WDM system 130 may have interchangeable line cards that support particular standard physical layers, such as SONET, Ethernet, etc. The physical layer signal coding of the outputs 120 and the inputs 140 may be the same or may be different.

By contrast, the modulation and line coding used within the WDM system 130 is typically different from that used to communicate with the LSD(s) 110 and LDD(s) 150. The modulation and line coding used within the WDM system 130 is typically proprietary. Because it is a language only spoken by a single vendor's, or a few vendors', WDM systems, a single vendor or a few vendors must supply both the multiplexer 132 and the demultiplexer 136 at both ends of the fiber 134. Different vendors' WDM systems often do not interoperate for this reason. Hence, the media and modulation used within the WDM system 130 are determined solely by the WDM vendor and are "opaque" to the switches/routers 110 and 150. Thus, the WDM system 130 may be said to perform "opaque WDM."

The conventional WDM system 130 may be termed "opaque" in the following additional sense. The multiplexer 132 and the demultiplexer 136 are both typically optical-to-electronic-to-optical (OEO) devices. The multiplexer 132, for example, converts received photons in an output 120 to an electrical signal, performs clock recovery, and generates a new optical signal for transmission down the fiber 134 using the electrical signal. Such clock recovery tends to "clean up" any (analog) imperfections in the output 120, but may introduce errors as well. As an example, if an imperfection in the output 120 is so great that a bit is incorrectly decoded (e.g., 1 as a 0 or vice versa), the multiplexer 132 may create a "clean" or full amplitude copy of the incorrect bit. The demultiplexer 136 will then receive the "clean," but incorrect, bit without awareness of the signal imperfection that caused the incorrect decoding of the bit. The conventional WDM system 130 thus may be termed "opaque" with respect to light (i.e., photons).

FIG. 2 is a block diagram of a conventional opaque WDM system 130 that includes optical-electronic and electronic-optical devices, such as receivers 210, transmitters 220, receivers 260, and transmitters 270. The WDM system 130 also includes a coupler 230 connected to a splitter 250 by an optical path 240. The n-channel WDM system 130 receives data from n separate physical interfaces 205, each carrying a data signal. Typically these interfaces 205 are fiber interfaces carrying SONET signals. The interfaces may alternatively be gigabit Ethernet interfaces or other types of interfaces. Receivers 210 perform optical-to-electronic (OE) signal conversion, as well as analog-to-digital (AD) conversion. The receivers 210 terminate the SONET section, Ethernet segment, etc., and convert modulated light pulses into digital, electronic information 215.

The transmitters 220 modulate the digital, electronic information 215 onto separate wavelengths of light. Each of the transmitters 220 converts the electronic digital information 215 to an optical analog signal 225, using its own laser. The lasers in the transmitters 220 may be either directly modulated or externally modulated. All the different analog signals 225 are coupled, and possibly amplified, by the optical coupler 230 into the optical path 240 for wide-area transmission.

On the receiving side of the optical path 240, the splitter 250 separates the received optical signal into its n component wavelengths 255. The splitter 250 passes each of the n wavelengths 255 to a receiver 260. Each of the receivers 260 demodulates its optical signal to recover the digital information 265 contained therein. The transmitters 270 transmit the recovered digital information 265 on their own separate physical ports 275. Although only one direction is shown in FIG. 2, typically sending and receiving systems 130 are deployed symmetrically. Hence, there would be an additional sending and receiving system 130 transmitting in the opposite direction.

The analog-to-digital and optical-to-electronic portions of the WDM system 130 are major contributors to its high cost. Additionally, these portions require upgrading every time that signaling speeds increase or formats change. When transmission speeds increase (for example, from OC12 to OC48 to OC192) or new protocols are to be supported, the receivers 210, the transmitters 220, the receivers 260, and the transmitters 270 have to be upgraded.

The problems inherent in this conventional architecture are several. The system requires one laser per wavelength. Demodulation and remodulation (optical-electrical-optical) within the WDM system is expensive. Also, WDM equipment is protocol-specific (i.e., SONET, Gigabit Ethernet, etc.), and each such standard protocol needs to be supported individually by the WDM equipment. Further, as noted above upgrades are troublesome due to their extensive nature.

As a result, a need exists for a WDM system that does not require OE conversion and that can readily support multiple protocols from attached switches and routers.

SUMMARY OF THE INVENTION

Systems and methods consistent with a preferred embodiment of the present invention address this and other needs by optically shifting wavelengths of input signals so that n different wavelengths result.

In accordance with the purpose of the invention as embodied and broadly described herein, a wavelength division multiplexer for multiplexing optical input signals includes a plurality of wavelength converters. Each of the converters receives at least one optical input signal and an optical pump signal and outputs at least one output signal having a wavelength that is shifted relative to a wavelength of the at least one optical input signal. A coupler combines the output signals from the plurality of wavelength converters into a multiplexed signal.

In another implementation consistent with the present invention, a method for wavelength division multiplexing in a system including a plurality of wavelength converters and a coupler includes receiving, by each of the wavelength converters, one or more optical input signals and an optical pump signal. A wavelength of the one or more optical input signals is shifted based on a wavelength of the optical pump signal to produce one or more shifted output signals. The shifted output signals are combined into a combined signal by the coupler.

In another implementation consistent with the present invention, a wavelength division multiplexer for multiplexing n optical input signals having a common wavelength, where n is an integer greater than 1, includes n wavelength converters, each of the converters receiving one of the n optical input signals and an optical pump signal. Each converter optically generates one output signal having a wavelength that is shifted relative to the common wavelength by a different amount from wavelengths of other ones of the output signals. A coupler combines the output signals from the n wavelength converters into a combined signal.

In yet a further implementation consistent with the present invention, a wavelength division multiplexer for multiplexing optical input signals from one or more network devices includes a first group of wavelength converters. Each of the converters in the first group receives a plurality of the optical input signals and an optical pump signal and optically generates a plurality of first output signals each having a wavelength that is shifted based on a wavelength of the pump signal. The multiplexer also includes a second group of wavelength converters, each of the converters in the second group receiving at least one first output signal from each converter in the first group and an optical pump signal and optically generating a plurality of second output signals each having a wavelength that is shifted based on a wavelength of the pump signal. A coupler optically coupled to the second group of wavelength converters combines its input signals into a combined signal.

Such implementations advantageously may allow any link source device, e.g., router/switch, to use any modulation and framing to communicate with a like network device through the transparent WDM system, obviating the need for coordination with the WDM system. Transparent WDM systems consistent with the invention may not require optical-electrical-optical (OEO) or analog-digital-analog (ADA) receiver and modulator components. Transparent WDM systems consistent with the invention advantageously may not need to be upgraded when modulation speeds or protocols of the connected devices change.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Wavelength division multiplexing systems and methods consistent with the present invention include an array of wavelength converters receiving n input signals of a common wavelength and shifting the wavelength of each input signal by a different amount so that n different wavelengths result. Each of the wavelength converters receives pumping light of a different wavelength that operates to shift the wavelength of the input signal by a known amount. At the receiving side, a passive (or active) wavelength splitter is used, and the n optical signals are delivered directly to a receiving link destination device. Receivers in the router or switch generally are not wavelength-specific, so the n optical signals need not be shifted back to the common wavelength prior to the receiving LDD, though they may be so shifted if required.

Exemplary System Configuration

Figure 1:
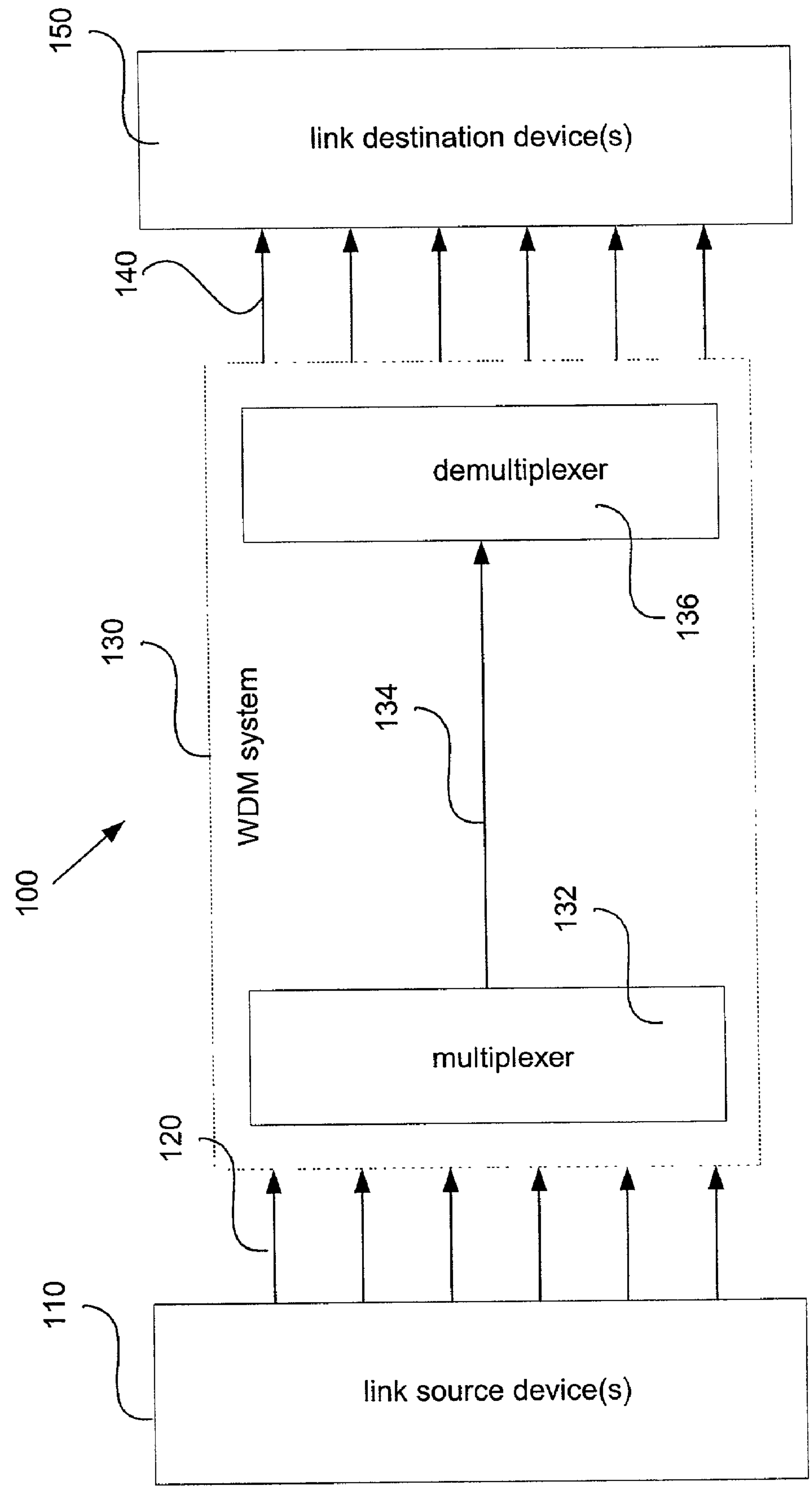
FIG. 1 is an overview of a conventional system involving wavelength division multiplexing and demultiplexing.
Figure 2:
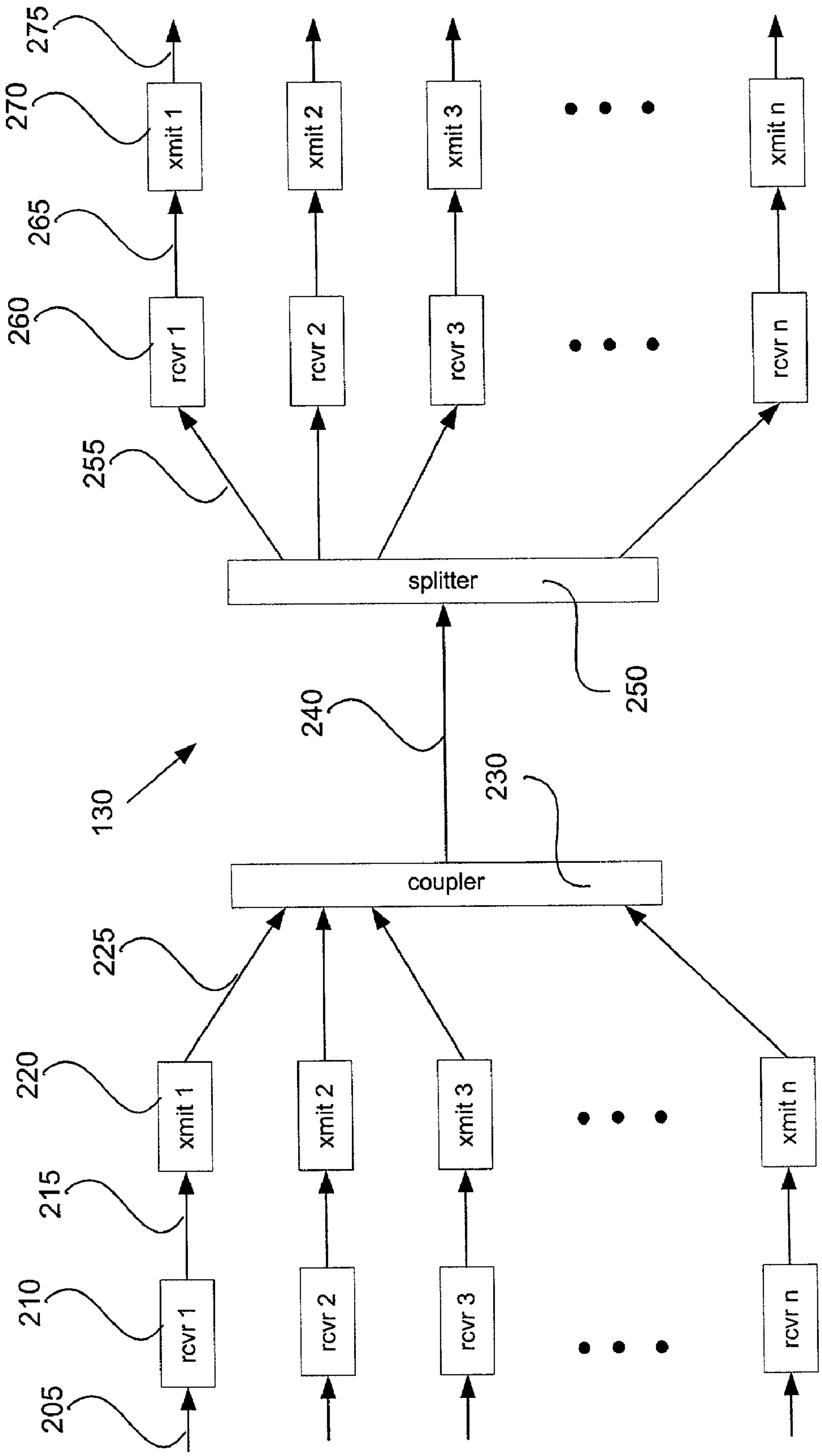
FIG. 2 is a more detailed view of a conventional WDM system.
Figure 3:
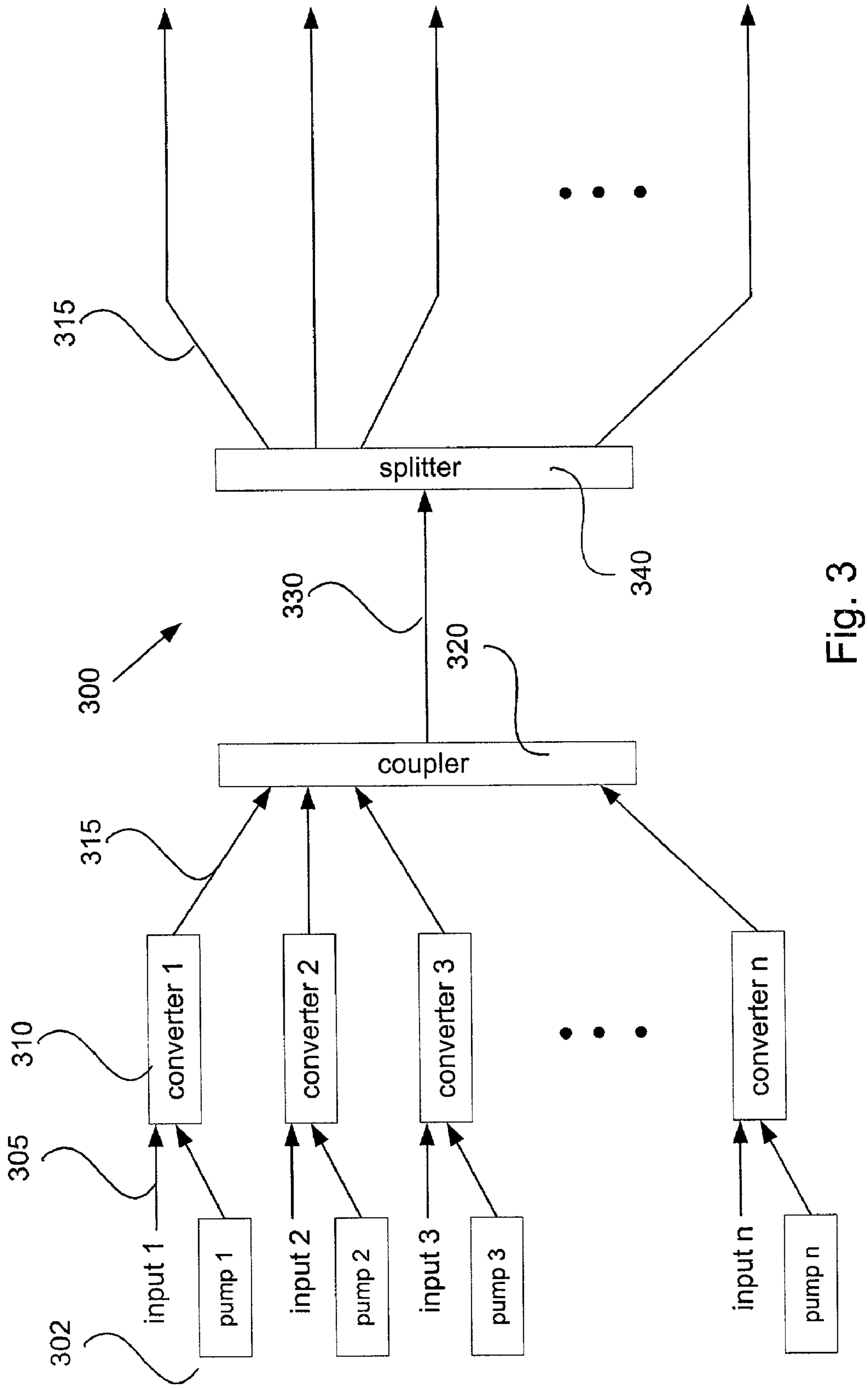
FIG. 3 is a schematic view of a transparent WDM system using one layer of wavelength converters according to an implementation consistent with the present invention.

FIG. 3 is an exemplary block diagram of a transparent WDM (TWDM) system 300 consistent with the present invention. The TWDM system 300 may include n pump lasers 302, n wavelength converters 310, a coupler 320, an optical path 330, and a splitter 340. The pump lasers 302 may include conventional laser diodes that generate pump signals. Each of the pump lasers 302 may generate a light signal of a different wavelength and emit the light signal as a pump signal to a corresponding one of the wavelength converters 310.

The wavelength converters 310 may include mixers, such as three-wave mixers, that receive input optical signals 305 from, for example, one or more network devices, such as routers or switches, and light signals from the pump lasers 302. In an implementation consistent with the present invention, the received optical signals 305 have a common wavelength and may be space-division multiplexed.

Figure 4:
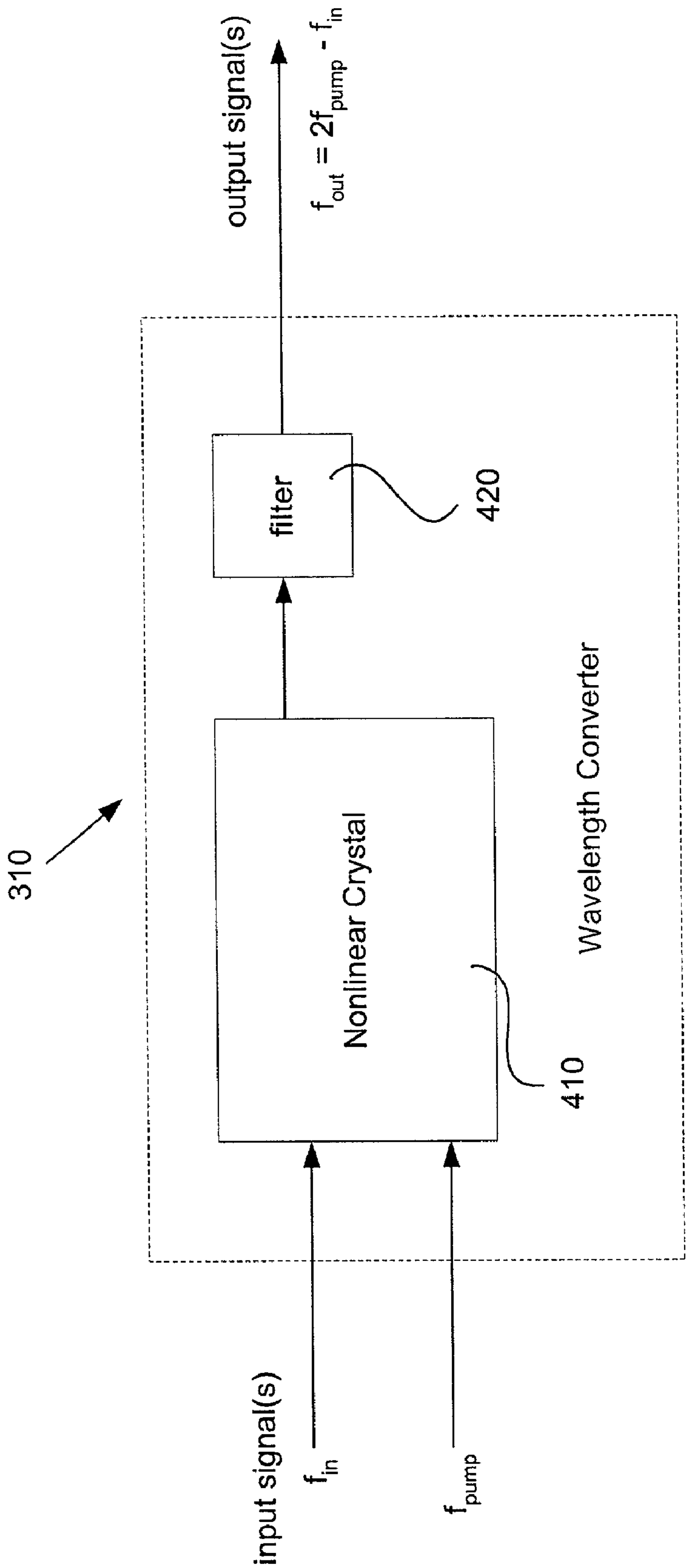
FIG. 4 is a schematic view of a wavelength converter.

FIG. 4 is an exemplary diagram of the wavelength converter 310 according to an implementation consistent with the present invention. The converter 310 may include a nonlinear crystal 410 and a filter 420. The nonlinear crystal 410 may include a conventional crystal, such as the ones described in the following documents, which are incorporated herein by reference:

Eyres et al., "MBE growth of laterally antiphase-patterned GaAs films using thin Ge layers for waveguide mixing," Proceedings of the 1998 Conference on Lasers and Electro-Optics (CLEO), IEEE, 1998, p 276.

Arbore et al., "Difference frequency mixing in $LiNbO_4$ waveguides using an adiabatically tapered periodically-segmented coupling region," Proceedings of the 1996 Conference on Lasers and Electro-Optics (CLEO '96), 1996, p 120–121.

Chou et al., "Bidirectional wavelength conversion between 1.4 and 1.5 $\mu$m telecommunication bands using difference frequency mixing in $LiNbO_4$ waveguides with integrated coupling structures," Proceedings of the 1998 Conference on Lasers and Electro-Optics (CLEO), IEEE, 1998, p 475–476.

The nonlinear crystal 410 receives one or more of the input optical signals 305, having a frequency $f_{in}$, and a pump signal, having a frequency $f_{pump}$. The crystal 410 produces one or more corresponding output signals, having a frequency $f_{out}$, according to the following relation:

$$f_{out} \cong (2^* f_{pump}) - f_{in} \quad (1)$$

The crystal 410 shifts the frequency $f_{out}$ (and hence the wavelength $\lambda_{out}$) of the output signals with respect to the input signals. In this application, "wavelength" and "frequency" will be used somewhat interchangeably. Those skilled in the art will appreciate that the frequency and wavelength of light are inversely related, and readily convertible, by the well-known relationship $c=f^*\lambda$, where c is the speed of light, f is frequency, and $\lambda$ is wavelength.

The nonlinear crystal 410 may contain parallel waveguides to accommodate more than one input signal. In such a configuration, the frequency of the input signal in each waveguide will be shifted according to the relationship of its input frequency to the frequency of the pump laser as set forth in Equation 1.

Along with the desired output signal wavelength, other undesired wavelengths may also be generated or may pass through the crystal 410. These undesired wavelengths may be filtered out using one of various filters 420 well known to those skilled in the art, such as the filters described in the following document, which is incorporated by reference:

Kartalopoulos, "Introduction to DWDM Technology," SPIE Optical Engineering Press, 2000.

Depending on whether the undesired wavelengths would adversely affect the operation of subsequent components, the filter 420 may be omitted.

Although nonlinear three-wave mixing has been described above, other nonlinear phenomena, such as four-wave mixing, may alternatively be employed to accomplish the wavelength conversion.

Returning to FIG. 3, the wavelength converters 310 generate output signals 315, having n unique wavelengths, and transmit the output signals 315 to the coupler 320. The coupler 320 may include a multiplexing device that merges together, and possibly amplifies, the output signals 315 and launches the signals into the optical path 330.

The splitter 340 may include an active or passive device, such as a grating, that receives the signals from the optical path 330 and separates them. The splitter 340 may transmit the separated signals to one or more network devices, such as routers or switches. In an implementation consistent with the present invention, the splitter 340 may not convert the signals back into the common, or "baseband," wavelengths in which they were received by the TWDM system 300. One reason for this is that photodiodes (not shown) in the receivers generally are not wavelength-specific. Hence, signals of n different wavelengths may be directly passed to the routers or switches.

The TWDM system 300 employs the array of wavelength converters 310 to provide wavelength division multiplexing without the need for optical-electrical-optical (OEO) or analog-digital-analog (ADA) conversion. The n output optical signals may be delivered directly to the receiving LDD ports. Because the wavelengths of the input signals are merely shifted, and because the system 300 does not change the modulation or framing of the input signal, this WDM system 300 may be said to be "transparent" to the link endpoint devices (not shown) at its inputs and outputs.

Several advantages of such an implementation of the invention are apparent. A LSD may use nonstandard modulation and communicate with a like LDD through the TWDM system 300. That is, the link endpoint devices at either the input or output of the TWDM system 300 need not use a standard protocol (e.g., SONET, Ethernet), nor does the TWDM system 300 need to conform (e.g., via interface cards) to such a standard protocol. Also, the TWDM system 300 may not require OEO or ADA receiver and modulator components, thereby reducing overall system costs. Further, the TWDM system 300 may not need to be upgraded when modulation speeds or framing protocols of the connected routers or switches change.

Exemplary Processing

Figure 5:
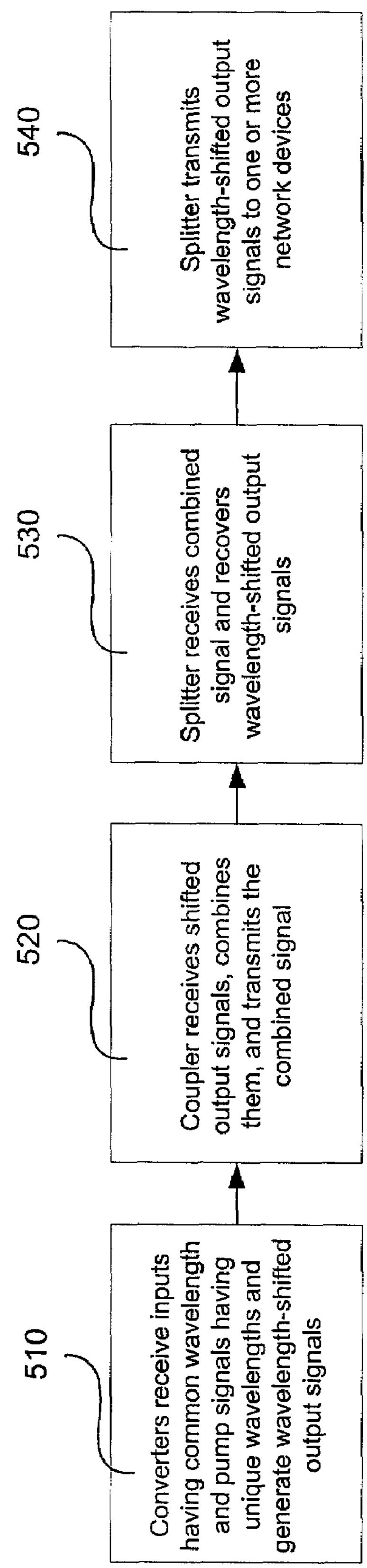
FIG. 5 is a flow chart illustrating processing performed by the system of FIG. 3.

FIG. 5 is an exemplary flow chart of processing by the TWDM system 300 (FIG. 3) according to an implementation consistent with the present invention. Processing may begin with a network device transmitting an optical input signal, having a common wavelength, that is eventually received by the TWDM system 300. The wavelength is considered "common" because other network devices may transmit optical input signals that have the same "common" wavelength.

A converter 310 may receive the optical input signal from the network device and a pump signal from a pump laser 302 [step 510]. The nonlinear crystal 410 (FIG. 4) of the converter 310 may operate upon the input signal to shift the wavelength of the input signal by an amount based on a wavelength of the pump signal (Equation 1), resulting in a wavelength-shifted output signal [step 510]. The filter 420 may operate upon the wavelength-shifted output signal to remove undesired, superfluous wavelengths, if necessary.

The converter 310 may then provide the wavelength-shifted output signal to the coupler 320. The coupler 320 may combine the wavelength-shifted output signal with wavelength-shifted output signals from other ones of the converters 310 [step 520]. Each of the output signals received by the coupler 320 may be wavelength-shifted by a different amount by the corresponding converter 310 based on the wavelength of the pump signal generated by the associated pump laser 302. The coupler 320 may transmit the combined signal (i.e., the combined wavelength-shifted output signals) on the optical path 330 [step 520].

The splitter 340 may receive the combined signal from the path 330 and either actively or passively separate the wavelengths contained therein to recover the wavelength-shifted output signals [step 530]. The splitter 340 may then transmit the recovered signals to one or more network devices, as appropriate [step 540]. In an implementation consistent with the present invention, the splitter 340 delivers the recovered signals without shifting the signals back to the common wavelength in which they were received by the TWDM system 300. One reason that the splitter 340 may deliver the signals without converting them back to the common wavelength in which they were received is that the receivers typically used by the network devices are not wavelength specific and so may operate upon signals of many different wavelengths.

Exemplary Two-layer Configuration

Figure 6:
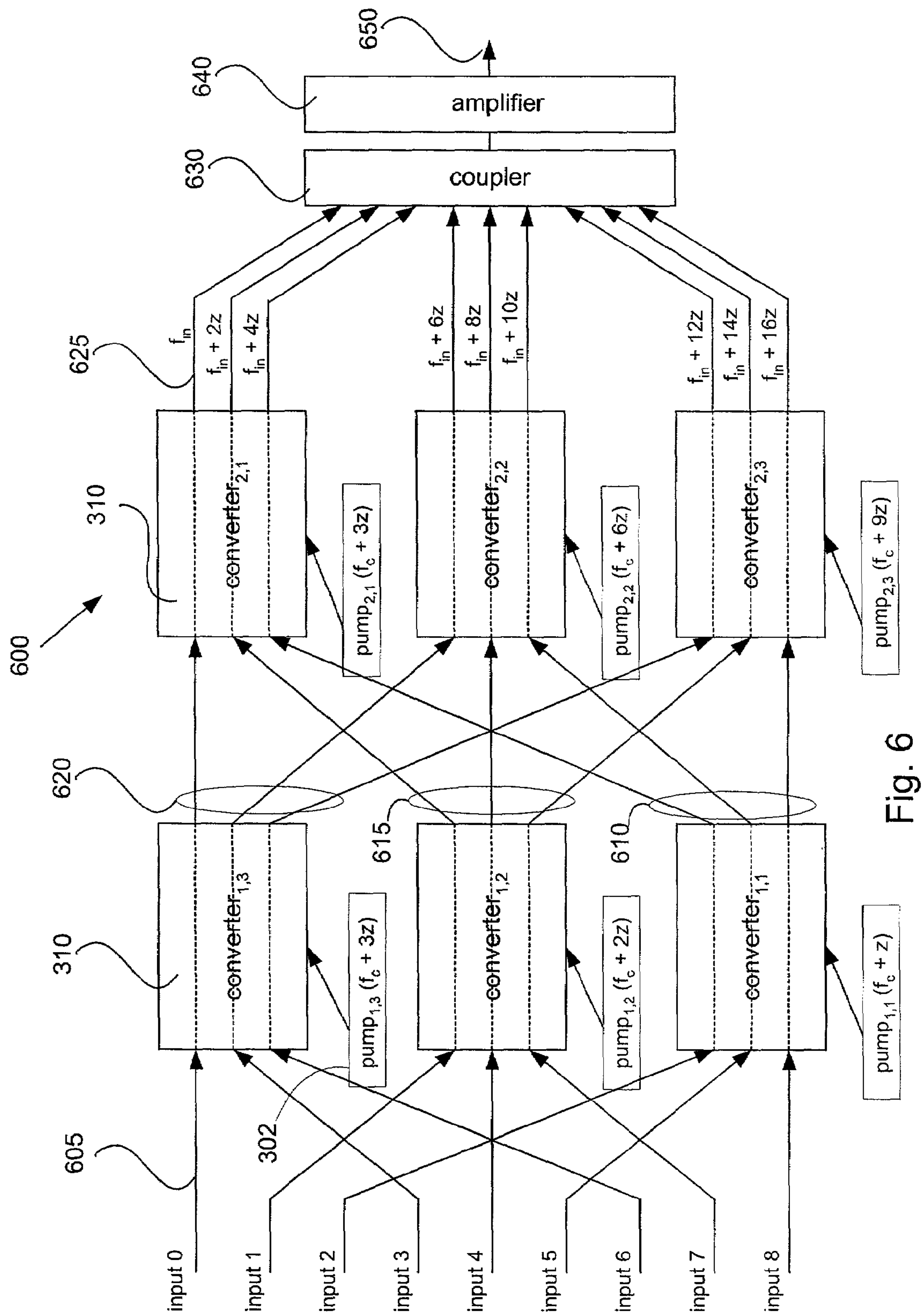
FIG. 6 is a schematic view of a multiplexing portion of a transparent WDM system using a two-layer array of wavelength converters according to another implementation consistent with the present invention.

FIG. 6 is an exemplary two-layer, nine input, TWDM multiplexing portion 600 consistent with the present invention. The TWDM multiplexing portion 600 includes an array of wavelength converters 310, a coupler 630, and an amplifier 640 that connects to an optical fiber 650. Pump lasers 302 that generate pump signals of different wavelengths connect to the wavelength converters 310. In this implementation, each of the converters 310 operates upon three input signals 605. The input signals 605 may have a common input frequency $f_{in}$, and may run in parallel waveguides (illustrated in FIG. 6 as dotted lines) through the converters 310. The frequency of the input signal in each waveguide may be shifted by the converter 310 according Equation 1.

A first layer (i.e., converter$_{1,1}$ through converters$_{1,3}$) of the converters 310 receives nine input signals 605 from a network device, such as a router or switch. Each of converter$_{1,1}$ through converter$_{1,3}$ receives three of the nine inputs, which have a common input frequency $f_{in}$. Each of converter$_{1,1}$ through converter$_{1,3}$ shifts its three inputs from the common input frequency $f_{in}$ to produce shifted output signals 610, 615, and 620, respectively. The three sets of shifted output signals 610, 615, and 620 each may be shifted a different amount from the common input frequency $f_{in}$. A second layer (i.e., converter$_{2,1}$ through converter$_{2,3}$) of the converters 310 receives the nine outputs 610, 615, 620 from the first layer of converters. Converter$_{1,1}$ sends each of its three output signals 610 to a different one of converter$_{2,1}$ through converter$_{2,3}$. Similarly, converter$_{1,2}$ sends each of its three output signals 615 to a different one of converters through converter$_{2,3}$, and converter$_{1,3}$ sends each of its three output signals 620 to a different one of converter$_{2,1}$ through converter$_{2,3}$. According to this arrangement, each signal of the nine different input signals 605 passes through a different pair of wavelength converters 310. In other words, exactly one signal passes through the pair (converter$_{1,i}$+converter$_{2,j}$) for each possible permutation of (i, j), where i and j both range from 1 to 3. Thus, the second layer of the converters 310 (i.e., converter$_{2,1}$ through converter$_{2,3}$) produces nine output signals 625 with different wavelengths.

The coupler 630 may include a multiplexing device similar to the coupler 320, and may combine the output signals 625. The combined signal may be amplified by the amplifier 640. The amplifier 640 may include an erbium doped fiber amplifier that is capable of amplifying many wavelengths simultaneously. The amplifier 640 may compensate for the power loss in the wavelength conversion process, and may obviate the need for individual amplifiers in each wavelength converter 310.

In the exemplary multiplexing portion 600, the frequencies of the pump signals generated by the pump lasers 302 may be selected such that the wavelengths of the signals 625 output by the second layer of converters 310 differ from one another. As explained earlier with regard to Equation 1, for the converters 310, the output frequency is equal to twice the pump frequency minus the input frequency. When an input signal having an input frequency $f_{in}$ successively passes through two converters having pump frequencies $f_{pump1}$, and $f_{pump2}$, the output frequency of the second converter may be expressed as:

$$\begin{aligned} f_{out} &= 2f_{pump2} - (2f_{pump1} - f_{in}) \\ &= f_{in} + 2(f_{pump2} - f_{pump1}) \end{aligned} \tag{2}$$

The frequencies of the pump lasers 302 may be chosen as follows to achieve outputs 625 of different frequencies. In this implementation consistent with the present invention, the desired frequency spacing between adjacent outputs 625 is assumed to be 2z, where z is a variable representing half of the desired frequency spacing between adjacent outputs. The pump lasers 302 for the first layer of converters 310 may be constructed with pump frequencies of ($f_c$+1z), ($f_c$+2z), and ($f_c$+3z), for any arbitrary frequency $f_c$. In a similar manner, the pump lasers 302 for the second layer of converters 310 may be constructed with pump frequencies of ($f_c$+3z), ($f_c$+6z), and ($f_c$+9z).

Exemplary Processing of Two-layer System

Figure 7:
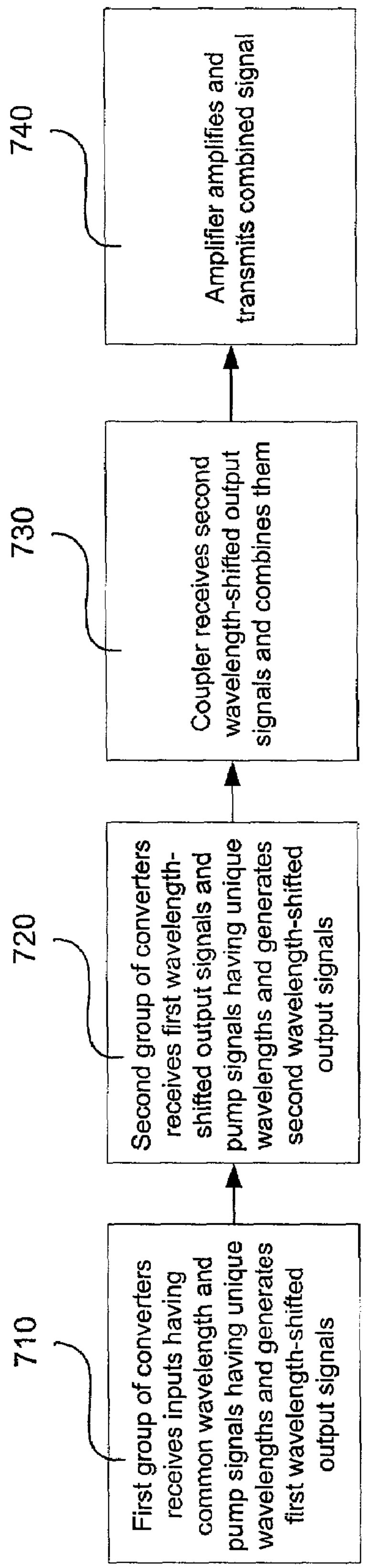
FIG. 7 is a flow chart illustrating processing performed by the system of FIG. 6.

FIG. 7 is an exemplary flow chart of processing by the two-layer TWDM multiplexing portion 600 (FIG. 6) according to an implementation consistent with the present invention. Processing may begin with one or more network devices transmitting an optical input signal, having a common wavelength, that is eventually received by the multiplexing portion 600. The wavelength is considered "common" because other network devices may transmit optical input signals that have the same "common" wavelength.

Each converter 310 in the first group of converters may receive three optical input signals 605 from the network device(s) and a pump signal from a pump laser 302 [step 710]. The nonlinear crystals 410 (FIG. 4) of the converters 310 in the first group may operate upon the input signals to shift the wavelength of each of the three input signals by an amount based on a wavelength of the pump signal (Equation 1). The three converters (i.e., $\text{converter}_{1,1}$ through converters $_{1,3}$) in the first group output sets of three wavelength-shifted output signals 610, 615, and 620 [step 710]. The three output signals from a given converter 310 (e.g., output signals 610 from $\text{converter}_{1,1}$) may all possess an identical shifted wavelength, due to the common wavelength of the three corresponding input signals 605.

The converters 310 in the first group may then provide the wavelength-shifted output signals 610, 615, and 620 to the second group of converters. Each converter 310 in the second group of converters may receive one input signal (i.e., 610, 615, and 620) from each of the converters 310 in the first group and a pump signal from a pump laser 302 [step 720]. The nonlinear crystals 410 (FIG. 4) of the converters 310 in the second group may operate upon the input signals to shift the wavelength of each input signal by an amount based on a wavelength of the pump signal (Equation 1). The three converters (i.e., $\text{converter}_{2,1}$ through $\text{converter}_{2,3}$) in the second group output wavelength-shifted output signals 625 [step 720].

The coupler 630 may combine the wavelength-shifted output signals 625 [step 730]. Each of the output signals received by the coupler 320 may be wavelength-shifted by a different amount by the corresponding converter 310 in the second group based on the wavelength of the pump signal generated by the associated pump laser 302. The coupler 630 may output the combined signal (i.e., the combined wavelength-shifted output signals) to the amplifier 640 [step 730]. The amplifier 640 may amplify the combined signal, and may transmit the amplified signal along fiber 650 [step 740].

Several exemplary input signals will now be followed through the first and second layers of converters in FIG. 6 to further explain processing steps 710 and 720. $\text{Converter}_{1,3}$ receives input 0 ($f_{in}$) and $\text{pump}_{1,3}$ ($f_c$+3z) and generates signal 620 with frequency $2f_c+6z-f_{in}$. $\text{Converter}_{2,1}$ then receives signal 620 ($2f_c+6z-f_{in}$) and $\text{pump}_{2,1}$ ($f_c$+3z) and generates signal 625 with frequency $f_{in}$. Similarly, $\text{converter}_{1,2}$ receives input 1 ($f_{in}$) and $\text{pump}_{1,2}$ ($f_c$+2z) and generates signal 615 with frequency $2f_c+4z-f_{in}$. $\text{Converter}_{2,1}$ then receives signal 615 ($2f_c+4z-f_{in}$) and $\text{pump}_{2,1}$ ($f_c$+3z) and generates signal 625 with frequency $f_{in}$+2z. Similarly, $\text{converters}_{1,3}$ receives input 2 ($f_{in}$) and $\text{pump}_{1,1}$ ($f_c$+z) and generates signal 610 with frequency $2f_c+2z-f_{in}$. $\text{Converter}_{2,1}$ then receives signal 610 ($2f_c+2z-f_{in}$) and $\text{pump}_{2,1}$ ($f_c$+3z) and generates signal 625 with frequency $f_{in}$+4z. Accordingly, the nine outputs 625 from the second layer of converters 310 are spaced at 0, 2z, 4z, . . . , 16z from the common input frequency $f_{in}$, as desired.

General Layered System Configuration

The above two-layer converter architecture may be generalized to have a different number of inputs n, provided that $n=k^2$ for some integer k, as follows. Again assuming a desired frequency spacing of 2z, for a given signal that passes through ($\text{converter}_{1,i}$+$\text{converter}_{2,j}$), the output frequency may have the following relation:

$$
\begin{aligned}
f_{out} &= f_{in} + 2(f_{pump2} - f_{pump1}) \quad (3)\\
&= f_{in} + 2((f_c + jkz) - (f_c + iz))
\end{aligned}
$$

-continued $$= f_{in} + 2(jk - i)z$$

As i, j vary across all possible values (1 . . . k, 1 . . . k), the $f_{out}$ value may change as follows:

$$
\begin{aligned}
&i = k,\ j = 1:\ f_{out} = f_{in} + 2(1k - k)z = f_{in}\\
&i = k - 1,\ j = 1:\ f_{out} = f_{in} + 2(1k - (k - 1))z = f_{in} + 2z\\
&\ldots\\
&i = 1,\ j = 1:\ f_{out} = f_{in} + 2(1k - 1)z = f_{in} + 2(k - 1)z\\
&i = k,\ j = 2:\ f_{out} = f_{in} + 2(2k - k)z = f_{in} + 2(k)z\\
&i = k - 1,\ j = 2:\ f_{out} = f_{in} + 2(2k - (k - 1))z = f_{in} + 2(k + 1)z\\
&\ldots\\
&i = 1,\ j = k:\ f_{out} = f_{in} + 2(k^2 - 1)z = f_{in} + 2(n - 1)z
\end{aligned}
$$

The exemplary implementation of FIG. 6 also may be generalized to have more than two layers. With (a) layers, (a) being an integer greater than or equal to two, the number of pump lasers and crystals in each layer is $n^{1/a}$. Hence, the total number of pump lasers and multi-input wavelength converters required for a generalized (a)-layer system is $(a)(n^{1/a})$. For example, a 64-channel system having two layers requires $2(64^{1/2})$=16 converters. A 64-channel system having three layers requires $3(65^{1/3})$=12 converters.

Each of the $n^{1/a}$ converters receives $n^{1-(1/a)}$ inputs and produces the same number of outputs. For the one layer case (e.g., FIG. 3), each converter has $n^{1-1}$=1 input and output. However, as the number of layers grows, so does the number of inputs and outputs per converter. The two-layer 64 channel system discussed above includes $64^{1-(1/2)}$=8 inputs and outputs per converter. The three-layer 64 channel system includes $64^{1-(1/3)}$=16 inputs and outputs per converter. Connecting, for example, 64 outputs from a first layer of four converters to a second layer of four converters and to a third layer of four converters may pose practical difficulties. Those skilled in the art will balance the lower numbers of converters and lasers in a multiple-layer system against the higher numbers of inputs and outputs per converter to determine an acceptable solution. As will be appreciated, other wavelength converter configurations are possible. For example, a 64 input configuration may use two groups of 16 converters, each of the 32 converters having four inputs and four outputs.

It will be apparent to those skilled in the art that various modifications and variations can be made in the TWDM system and method of the present invention without departing from the spirit or scope of the invention. For example, other types of nonlinear wavelength converters may be equivalently substituted for the three-wave mixers described above. Also, those skilled in the art, in view of the specification, will be able to devise other combinations of input and/or pump wavelengths which will yield a desired wavelength or frequency spacing for the outputs. For example, all input wavelengths need not be the same, and all pump wavelengths need not be different, as long as the desired wavelength or frequency spacing for the outputs is achieved. Thus, it is intended that the present invention cover the modifications and variations of the invention provided that they come within the scope of the appended claims and their equivalents.

What is claimed is:

1. A wavelength division multiplexer for multiplexing optical input signals, the multiplexer comprising:

a plurality of groups of wavelength converters, the wavelength converters of a first one of the groups receiving optical input signals with a common wavelength and different optical pump signals and outputting wavelength-shifted output signals, the wavelength converters of an mth one of the groups receiving the wavelength-shifted output signals from an m−1th one of the groups and outputting wavelength-shifted output signals with wavelengths that are differently shifted relative to the common wavelength of the optical input signals, where m is an integer greater than 1; and a coupler combining the wavelength-shifted output signals from the wavelength converters of the mth one of the groups into a multiplexed signal.

2. The multiplexer of claim 1, wherein each of the wavelength converters of the first one of the groups receives a different one of the optical input signals and generates one of the wavelength-shifted output signals.

3. The multiplexer of claim 1, wherein the optical input signals include n optical input signals, and wherein the plurality of groups of wavelength converters includes:

(a) groups of wavelength converters configured so that each of the n optical input signals passes through a unique set of (a) wavelength converters, where (a) and n are integers greater than 1.

4. The multiplexer of claim 3, wherein the (a) groups of wavelength converters include:

(a) groups of $n^{1/a}$ wavelength converters, a first group of the $n^{1/a}$ wavelength converters receiving the optical input signals and outputting wavelength-shifted output signals to a next group of the $n^{1/a}$ wavelength converters, where ($n^{1/a}$) is an integer greater than 1.

5. The multiplexer of claim 4, wherein each of the wavelength converters in the first group receives $n^{1-(1/a)}$ optical input signals and outputs $n^{1-(1/a)}$ wavelength-shifted output signals.

6. The multiplexer of claim 1, wherein at least one of the wavelength converters includes:

a nonlinear crystal receiving at least one of the optical input signals and at least one of the optical pump signals.

7. The multiplexer of claim 6, wherein at least one of the wavelength converters further includes:

a filter connected to an output of the nonlinear crystal.

8. The multiplexer of claim 1, further comprising:

an amplifier connected to the coupler to amplify the multiplexed signal.

9. The multiplexer of claim 1, further comprising:

a plurality of pump lasers, each of the pump lasers being connected to one of the wavelength converters and outputting an optical pump signal having a unique wavelength.

10. A wavelength division multiplexer for multiplexing optical input signals, the multiplexer comprising:

a plurality of wavelength converters, the wavelength converters receiving optical input signals with a common wavelength and different optical pump signals and outputting output signals with wavelengths that are differently shifted relative to the common wavelength of the optical input signals, a frequency of one of the output signals output by one of the wavelength converters is a constant multiple of a frequency of one of the optical pump signals minus a frequency of one of the optical input signals; and a coupler combining the output signals from the wavelength converters into a multiplexed signal.

11. A method for wavelength division multiplexing in a system including a plurality of groups of wavelength converters and a coupler, the method comprising:

receiving, by a first group of the wavelength converters, optical input signals with a common wavelength;

receiving, by the first group of wavelength converters, different optical pump signals;

shifting, by the first group of wavelength converters, the common wavelength of the optical input signals based on wavelengths of the optical pump signals to produce differently shifted output signals;

receiving, by an mth group of the wavelength converters, shifted output signals from an m−1 th group of the wavelength converters, where m is an integer greater than 1;

shifting the shifted output signals to produce differently shifted output signals; and combining the shifted output signals from the mth group of the wavelength converters into a combined signal by the coupler.

12. The method of claim 11, further comprising:

filtering unwanted wavelengths from the shifted output signals.

13. The method of claim 11, further comprising:

amplifying the combined signal to produce an amplified signal; and inputting the amplified signal into an optical fiber.

14. The method of claim 11, wherein the system includes:

n wavelength converters in at least the first group of wavelength converters, and wherein the receiving optical input signals includes:

receiving a different one of n optical input signals by each of the n wavelength converters.

15. The method of claim 11, wherein the system includes:

(a) interconnected groups of $n^{1/a}$ wavelength converters, where (a) and ($n^{1/a}$) are both integers greater than 1, and wherein the receiving optical input signals includes:

receiving n optical input signals by a first group of $n^{1/a}$ wavelength converters.

16. The method of claim 15, wherein the receiving optical input signals includes:

receiving $n^{1-(1/a)}$ optical input signals by each of the wavelength converters of the first group.

17. A method for wavelength division multiplexing in a system including a plurality of wavelength converters and a coupler, the method comprising:

receiving, by the wavelength converters, optical input signals with a common wavelength;

receiving, by the wavelength converters, different optical pump signals;

shifting, by the wavelength converters, the common wavelength of the optical input signals based on wavelengths of the optical pump signals to produce differently shifted output signals, the shifting includes:

shifting a frequency of one of the optical input signals to a constant multiple of a frequency of one of the optical pump signals minus the frequency of the one optical input signal; and combining the shifted output signals into a combined signal by the coupler.

18. A wavelength division multiplexer for multiplexing n optical input signals, where n is an integer greater than 1, the multiplexer comprising:

a first group of wavelength converters receiving the n optical input signals and outputting n wavelength-shifted output signals;

a second group of wavelength converters receiving the n wavelength-shifted output signals from the first group and outputting n second output signals, each of the n second output signals having a unique wavelength; and a coupler combining the second output signals from the second group of wavelength converters into a multiplexed signal, wherein each of the wavelength converters in the first and second groups receives m input signals and outputs m output signals having wavelengths that are shifted relative to wavelengths of the m input signals, where m is an integer greater than 1.

19. The multiplexer of claim 18, wherein each of the wavelength converters in the second group is coupled to a plurality of different wavelength converters in the first group, so that each of the n second output signals has passed through a unique pair of wavelength converters.

20. The multiplexer of claim 18 wherein each of the wavelength converters in at least the first group includes:

a nonlinear crystal receiving one of the n optical input signals and an optical pump signal and optically shifting the wavelength of said one of the n optical input signals to produce an intermediate signal, and a filter connected to an output of the nonlinear crystal to filter the intermediate signal and produce one of the n wavelength-shifted output signals.

21. A wavelength division multiplexer for multiplexing optical input signals from one or more network devices, the multiplexer comprising:

a first group of wavelength converters, each of the wavelength converters in the first group receiving a plurality of the optical input signals and an optical pump signal and optically generating a plurality of first output signals each having a wavelength that is shifted based on a wavelength of the pump signal;

a second group of wavelength converters, each of the wavelength converters in the second group receiving at least one first output signal from each of the wavelength converters in the first group and an optical pump signal and optically generating a plurality of second output signals each having a wavelength that is shifted based on a wavelength of the pump signal; and a coupler optically coupled to the second group of wavelength converters to combine the second output signals into a combined signal.

22. A method for wavelength division multiplexing in a system including at least two groups of wavelength converters and a coupler that is optically coupled to the groups of wavelength converters, the method comprising:

receiving, by each of a first group of wavelength converters, a plurality of optical input signals;

receiving, by each of the first group of wavelength converters, an optical pump signal;

shifting, by each of the first group of wavelength converters, a wavelength of the plurality of optical input signals based on a wavelength of the optical pump signal to produce a plurality of first output signals;

receiving, by each of a second group of wavelength converters, at least one first output signal from each one of the wavelength converters in the first group;

receiving, by each of the second group of wavelength converters, an optical pump signal;

shifting, by each of the second group of wavelength converters, a wavelength of the at least one first output signal based on a wavelength of the optical pump signal to produce a plurality of second output signals; and combining the second output signals into a combined signal by the coupler.

23. A wavelength division multiplexing system for transmitting n optical input signals, where n is an integer greater than 1, the system comprising:

a first group of wavelength converters receiving the n optical input signals and outputting n wavelength-shifted output signals;

a second group of wavelength converters receiving the n wavelength-shifted output signals from the first group and outputting n second output signals, each of the n second output signals having a unique wavelength;

a coupler combining the second output signals from the second group of wavelength converters into a multiplexed signal, wherein each of the wavelength converters in the first and second groups receives m input signals and outputs m output signals having wavelengths that are shifted relative to wavelengths of the m input signals, where m is an integer greater than 1;

an optical fiber to carry the multiplexed signal; and a splitter to receive the multiplexed signal from the optical fiber and produce n output signals, each of the n output signals having a wavelength that is shifted relative to a wavelength associated with the n optical input signals by a different amount from wavelengths of other ones of the n output signals.

24. A network, comprising:

one or more network devices configured to produce n optical input signals with a common wavelength, where n is an integer;

a wavelength division multiplexing system configured to receive the n optical input signals with the common wavelength and remotely deliver n optical output signals with different wavelengths, the system including:

a plurality of groups of wavelength converters, at least some of the wavelength converters being configured to receive a plurality of the n optical input signals with the common wavelength and an optical pump signal and optically generate a plurality of intermediate output signals, at least some other ones of the wavelength converters being configured to receive the intermediate output signals and optically generate the n optical output signals, each of the n optical output signals having a wavelength that is shifted relative to the common wavelength by a different amount from wavelengths of other ones of the output signals; and one or more other network devices configured to receive the n optical output signals with different wavelengths.

* * * * *